United States Patent
Brambach et al.

(10) Patent No.: US 10,948,894 B2
(45) Date of Patent: Mar. 16, 2021

(54) METHOD FOR DETECTING AT LEAST ONE TOOL STATE OF A TOOL OF A MACHINE TOOL FOR MACHINING WORKPIECES AND MACHINE TOOL

(71) Applicant: POINT 8 GMBH, Dortmund (DE)

(72) Inventors: Tobias Brambach, Dortmund (DE); Christophe Cauet, Landau in der Pfalz (DE); Florian Kruse, Dortmund (DE); Jochen Heinz, Rottweil (DE)

(73) Assignee: POINT 8 GMBH, Dortmund (DE)

( * ) Notice: Subject to any disclaimer, the term of this patent is extended or adjusted under 35 U.S.C. 154(b) by 114 days.

(21) Appl. No.: 16/190,265

(22) Filed: Nov. 14, 2018

(65) Prior Publication Data

US 2019/0171183 A1 Jun. 6, 2019

(30) Foreign Application Priority Data

Dec. 1, 2017 (DE) ...................... 10 2017 128 628.4

(51) Int. Cl.
  *G05B 19/4065* (2006.01)
  *B23Q 17/09* (2006.01)
  *B23Q 17/10* (2006.01)

(52) U.S. Cl.
  CPC ..... *G05B 19/4065* (2013.01); *B23Q 17/0952* (2013.01); *B23Q 17/0995* (2013.01); *B23Q 17/10* (2013.01); *G05B 2219/37252* (2013.01)

(58) Field of Classification Search
  CPC ........................ B23Q 17/0952; B23Q 17/0995; B23Q 17/10; G05B 19/4065; G05B 2219/37252
  See application file for complete search history.

(56) References Cited

U.S. PATENT DOCUMENTS

| | | | | | |
|---|---|---|---|---|---|
| 4,260,986 | A | * | 4/1981 | Kobayashi | G01N 3/58 235/421 |
| 5,568,028 | A | * | 10/1996 | Uchiyama | G05B 19/4065 318/433 |
| 5,587,915 | A | * | 12/1996 | Nagatomi | G05B 19/4065 700/177 |
| 2003/0072630 | A1 | * | 4/2003 | Kato | B23Q 1/0009 409/230 |

(Continued)

FOREIGN PATENT DOCUMENTS

| | | |
|---|---|---|
| DE | 3017020 A1 | 11/1981 |
| DE | 10029965 A1 | 1/2002 |

(Continued)

OTHER PUBLICATIONS

Yan et al., Rotary Machine Health Diagnosis Based on Empirical Mode Decomposition, Apr. 2008,, University of Massachusetts, p. 1-12. (Year: 2008).*

(Continued)

*Primary Examiner* — Kidest Bahta
(74) *Attorney, Agent, or Firm* — Bacon & Thomas, PLLC

(57) ABSTRACT

A method for detecting at least one tool state of a tool of a machine tool for machining workpieces, which includes at least one tool holder, at least one positioning drive, which includes at least one tool which is arrangeable or arranged rotationally fixed in the tool holder and which includes at least one control unit. The method includes the following steps: detecting or providing tool and/or workpiece data in the storage means and/or the control unit; providing at least one reference drive frequency of the rotary drive and/or the positioning drive; detecting at least one ACTUAL driving frequency of the rotary drive and/or the positioning drive; assigning the ACTUAL drive frequency of a reference drive frequency of the rotary drive and/or the positioning drive by the control unit and evaluating and/or interpreting at least the reference drive frequency associated with the ACTUAL drive frequency by the control unit.

15 Claims, 2 Drawing Sheets

(56) References Cited

U.S. PATENT DOCUMENTS

| | | | | |
|---|---|---|---|---|
| 2005/0238447 | A1* | 10/2005 | Murota | B23Q 17/22 409/194 |
| 2006/0018725 | A1* | 1/2006 | Ichino | F16F 15/22 409/131 |
| 2006/0142893 | A1* | 6/2006 | Yasugi | G05B 19/4065 700/174 |
| 2013/0253670 | A1* | 9/2013 | Chung | B23Q 17/0961 700/79 |
| 2015/0051727 | A1* | 2/2015 | Hasegawa | B23H 7/06 700/162 |
| 2016/0375570 | A1* | 12/2016 | Boeck | H02P 6/00 700/169 |

FOREIGN PATENT DOCUMENTS

| | | |
|---|---|---|
| DE | 102009025167 B3 | 9/2010 |
| DE | 102013103779 A1 | 10/2014 |
| EP | 1449615 A1 | 8/2004 |
| EP | 1679556 A1 | 12/2006 |
| EP | 2793088 A1 | 10/2014 |
| JP | 2011121139 A | 6/2011 |

OTHER PUBLICATIONS

Huang et al. Tool wear detection and fault diagnosis based on cutting force monitoring, Aug. 22, 2006, www.elsevier.com/locate/ijmactool, (National University of Singapore, Singapore 117576, Singapore), p. 444-451. (Year: 2006).*

German Examination Report in related DE Application No. 102017128628.4, dated Nov. 21, 2018.

European Office Action in corresponding European Application No. 18203987.5, dated May 7, 2019.

* cited by examiner

METHOD FOR DETECTING AT LEAST ONE TOOL STATE OF A TOOL OF A MACHINE TOOL FOR MACHINING WORKPIECES AND MACHINE TOOL

CROSS REFERENCE TO RELATED APPLICATIONS

This application claims priority to Germany application DE 10 2017 128 628.4, filed Dec. 1, 2017, which is incorporated by reference in its entirety.

The invention relates to a method for detecting at least one reference tool state of a tool of a machine tool for machining workpieces and a machine tool that can be operated by such a method.

BACKGROUND

Methods for detecting machining operations in and with machine tools are known. In this case, for example, detected and/or measured ACTUAL values of components of the machine tool are detected and compared with TARGET values in order to determine a proper operation of the machine tool or a deviation from a proper operation of the machine tool. Such a method is known, for example, from EP 13 163 801.

In the known methods, it has proved to be disadvantageous that for detecting an ACTUAL state of a component of the machine tool, sensor means must be provided with which the respective component can be monitored. This proves to be complicated and cost-intensive in many cases, in particular if the space available in the machine tool makes the installation of sensor means more difficult.

SUMMARY OF THE INVENTION

An object of an embodiment of the invention is to provide a method for detecting at least one tool state of a tool of a machine tool for machining workpieces, which is simple and inexpensive to carry out.

This object is achieved by a method for detecting at least one tool state of a tool of a machine tool for machining workpieces, which includes at least one tool holder, at least one tool holder drivable with, in particular electric, rotary drive, at least one, in particular electrical, positioning drive, by which a distance and/or an angle is adjustable at least between the workpiece and tool holder, which includes at least one tool which is arrangeable or arranged rotationally fixed in the tool holder and which includes at least one control unit comprising a storage means, with the following steps:
 a. Detecting or providing tool and/or workpiece data, such as dimensions and material, in the storage means and/or the control unit;
 b. Providing at least one reference drive frequency of the rotary drive and/or the positioning drive, which can be assigned a reference tool state of the tool at least as a function of the tool and/or workpiece data, such as dimensions and material;
 c. Detecting at least one ACTUAL drive frequency of the rotary drive and/or the positioning drive;
 d. Assigning the ACTUAL drive frequency of a reference drive frequency of the rotary drive and/or the positioning drive by the control unit and evaluating and/or interpreting at least the reference drive frequency associated with the ACTUAL drive frequency by the control unit;
 e. Possibly generating a display signal by which the reference tool state is displayable and/or possibly generating a message signal when the reference drive frequency associated with the ACTUAL drive frequency reaches or exceeds a reporting criterion.

By detecting the at least one ACTUAL drive frequency of the rotary drive and/or the positioning drive and by assigning the ACTUAL drive frequency of a reference drive frequency, the tool state of the tool can be determined in a simple manner. Additional sensor means can thereby be dispensed with.

By providing at least one reference drive frequency, the method can be used for a variety of machining operations. In contrast to the methods known from the prior art, for example, it is no longer necessary to assign an ACTUAL frequency to be assigned to a TARGET frequency for each machining of workpieces, as a result of which the number of possible machining operations to be stored in the control unit can be reduced.

In addition, this makes it possible to calibrate and measure the tool in the current process. By assigning the ACTUAL drive frequency of the rotary drive and/or the positioning drive to the reference drive frequency, the tool states of the tools can be determined by the method in accordance with the invention.

A detection of the state of the tool is also understood to include in the following an evaluation and prognosticating of the state of the tool.

The at least one positioning drive can be assigned to the tool holder and/or a workpiece holder. In this case, the tool holder with respect to a stationary workpiece or the workpiece with respect to a stationary tool holder or tool holder and workpiece can be moved relative to the room. In other words, the workpiece may be moved toward the tool, the tool toward the workpiece, or both toward or away from each other.

The reference drive frequency of the rotary drive and/or of the positioning drive can be stored or provided, for example, in the control unit or in the storage means of the control unit.

The detection of the at least one drive frequency of the rotary drive and/or the positioning drive can occur in an approach phase, in which the tool is moved by the rotary drive and/or positioning drive towards the workpiece, in a retraction phase, in which the tool is moved away from the workpiece, and/or in a work phase in which the tool works on the workpiece, in particular through machining, i.e. when machining the workpiece.

By generating a display signal, the tool state can be detected. As a result, the operating personnel who monitor the machine tool can always be provided with information about the state of the tool.

The process step e can optionally be carried out. This means that step e does not have to be compulsorily and consistently carried out.

By generating a message signal when the reference drive frequency associated with the ACTUAL drive frequency reaches or exceeds a reporting criterion, the detection of events requiring notification, such as tool breakage or the like, can be detected.

The individual method steps can be carried out at periodic time intervals, for example at intervals of 60 seconds and less, in particular 45 seconds and less, in particular 30 seconds and less, further in particular in less than 15 seconds and less, and in particular less than 5 seconds and less. This allows the amount of data to be processed by the control unit to be reduced.

Moreover, in one embodiment of the method, it is provided that all method steps take place continuously and, in particular, the detection of an ACTUAL drive frequency of the rotary drive and/or of the positioning drive takes place permanently. Accordingly, the further process steps are carried out permanently and consistently.

Moreover, it proves to be advantageous if the method comprises the following further step:

Displaying the display signal and/or signal on an external display means, which is independent of the machine tool.

Due to the fact that the display signal and/or the message signal can be displayed on a display means on the machine tool and/or on an external display means and can be forwarded to it prior, operating personnel at the machine or control personnel in a control room can be made aware of the tool state of the machine tool. In particular, if the display signal and/or the message signal is forwarded to an external display means, that is, to a display means which is independent of and remote from the machine tool several machine tools can, for example, be monitored by one and the same operator. In this case, the display of the display signal and/or the message signal can be carried out automatically or by querying by the operator.

The display signal or the message signal may in principle include displaying any information. It proves to be advantageous if the reference tool state that can be displayed by the display signal comprises at least information about the remaining service life of the tool and/or wear of the tool and/or if the reference tool state that can be indicated by the message signal indicates a dislodging of the tool, a breakage of the tool and/or an overload of the tool.

In addition, it proves to be advantageous if the ACTUAL drive frequency and/or the reference drive frequency includes the electrical current, the electrical power, the rotational or movement speed of the rotary drive, the rotational or movement speed of the positioning drive, the acceleration of the rotary drive, the acceleration of the positioning drive, the position of the rotary drive and/or the position of the positioning drive.

In this case, the ACTUAL drive frequency and the reference drive frequency include physical variables of the rotary drive and/or of the positioning drive, which are easily detectable and for whose detection, in particular, no additional sensor means are necessary.

The ACTUAL drive frequency, in particular the electrical current, the electrical power, the rotational speed of the rotary drive and/or the positioning drive, comprise input variables for determining the reference tool state.

It proves to be advantageous if the method comprises the following step:

Filtering the detected ACTUAL drive frequency of the rotary drive and/or the positioning drive and/or storing the detected actual drive frequency of the rotary drive and/or positioning drive in the storage means.

By filtering the detected ACTUAL drive frequency of the rotary drive and/or the positioning drive, measuring errors can be filtered out. By storing the detected actual drive frequency of the rotary drive and/or the positioning drive in the storage means, data for later evaluation, in particular validation, can be provided.

The storage means may for example comprise an internal storage means which is directly associated with the machine tool. In addition, the storage means may comprise an external storage means which is separated from the machine tool and spatially distanced.

In one embodiment of the method, it is provided that the storage means of the control unit comprises a distributed computer structure.

This makes it easy to access available computer capacities through which even large amounts of data can be handled and processed in a flexible manner when executing the method.

It proves to be advantageous if the provision of the reference drive frequency of the rotary drive and/or the positioning drive comprises a data-record-type storage of the reference drive frequency in the storage means and/or the control unit and/or a depositing of at least one algorithm for calculating the reference drive frequency of the rotary drive and/or the positioning drive and calculating the reference drive frequency.

If the provision of the reference drive frequency of the rotary drive and/or of the positioning drive comprises a data-record-type storage, a simple adjustment of the ACTUAL drive frequency to the reference drive frequency can be carried out without computation.

If the provision of the reference drive frequency comprises depositing at least one algorithm for calculating the reference drive frequency of the rotary drive and/or the positioning drive, the method is versatile and flexibly applicable, without having to keep data-record-type deposits, in particular databases.

In this case, the method is also applicable to different machine tools.

In addition, it proves to be advantageous if the machining of the workpiece includes an approach and retraction phase and a working phase of the tool and that the approach and retraction and working phase are assigned or can be assigned in each case a reference drive frequency As a result, the tool state of the tool can already be detected before a machining of the workpiece takes place. If, for example, during the approach phase, a tool condition is detected, by which machining of the workpiece is not possible or only possible with high quality losses, the tool can be changed before rejection occurs.

In order to validate the provided reference drive frequency, it proves to be advantageous if the method comprises the following steps:

Measuring and/or analysing the tool with a test device for determining the ACTUAL tool state of the tool and validating and/or adjusting the reference tool state by assigning the ACTUAL drive frequency at the detected ACTUAL tool state as a new reference drive frequency of the rotary drive and/or positioning drive.

In this case, the stored reference drive frequencies and/or the stored algorithm can be adapted, validated and refined. As a result, a difference of the reference tool state to a real tool state can be further reduced and prediction accuracy continuously improved.

Finally, the object is achieved by a machine tool, which is operable by a method of the aforementioned features, with at least one tool holder drivable with, in particular electric, rotary drive, with at least one, in particular electrical, positioning drive, through which a distance is adjustable at least between the workpiece and tool holder, with at least one tool which is arrangeable or arranged rotationally fixed in the tool holder and with at least one storage means comprising a control unit.

Further features, details and advantages of the invention will become apparent from the appended patent claims, the drawings and the following description of a preferred embodiment of the method for detecting at least one tool state of a tool of a machine tool for machining workpieces and the machine tool.

DETAILED DESCRIPTION OF THE INVENTION

Figure 1:
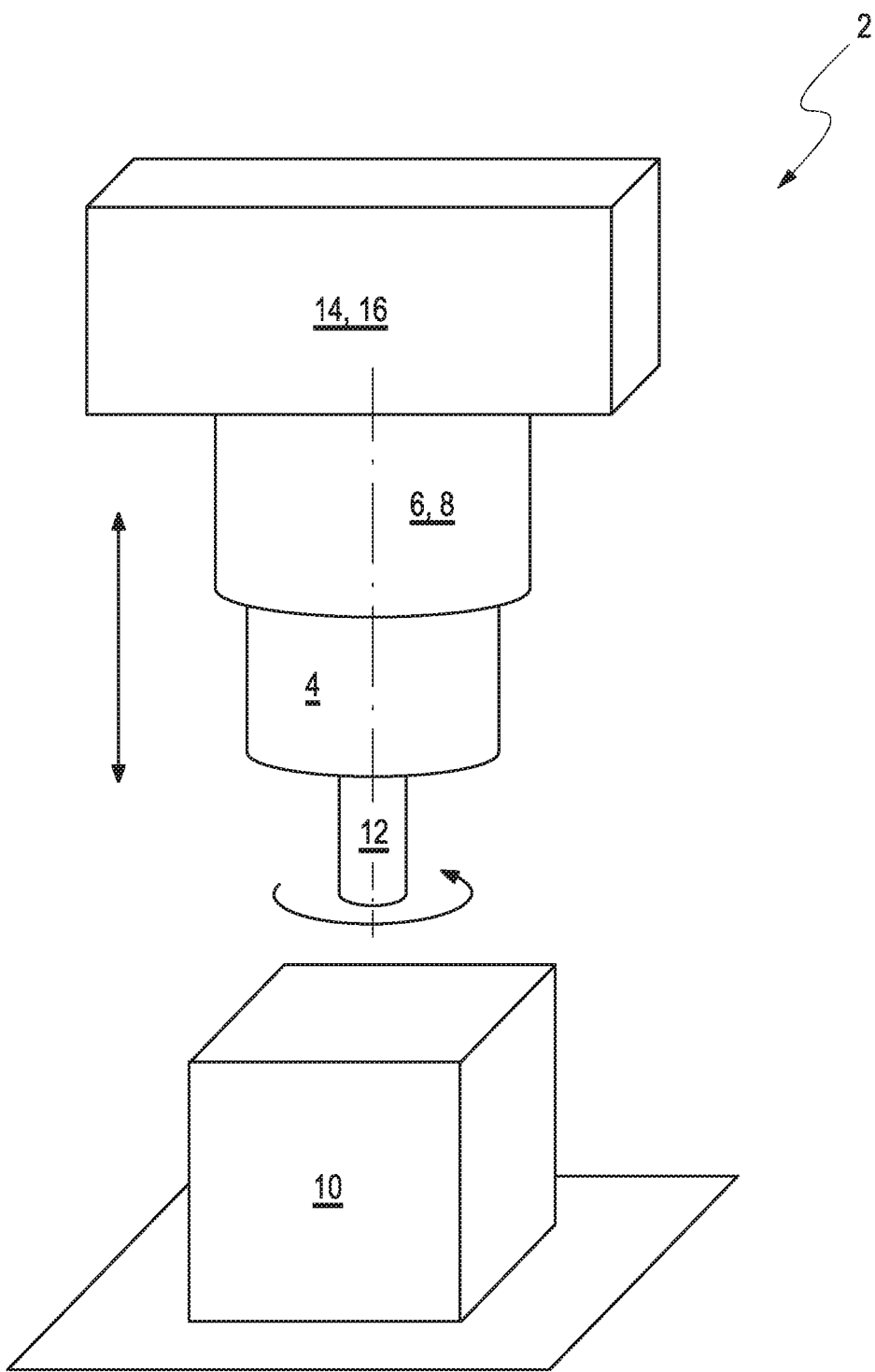
FIG. 1 is a side view of a schematically illustrated machine tool.
Figure 2:
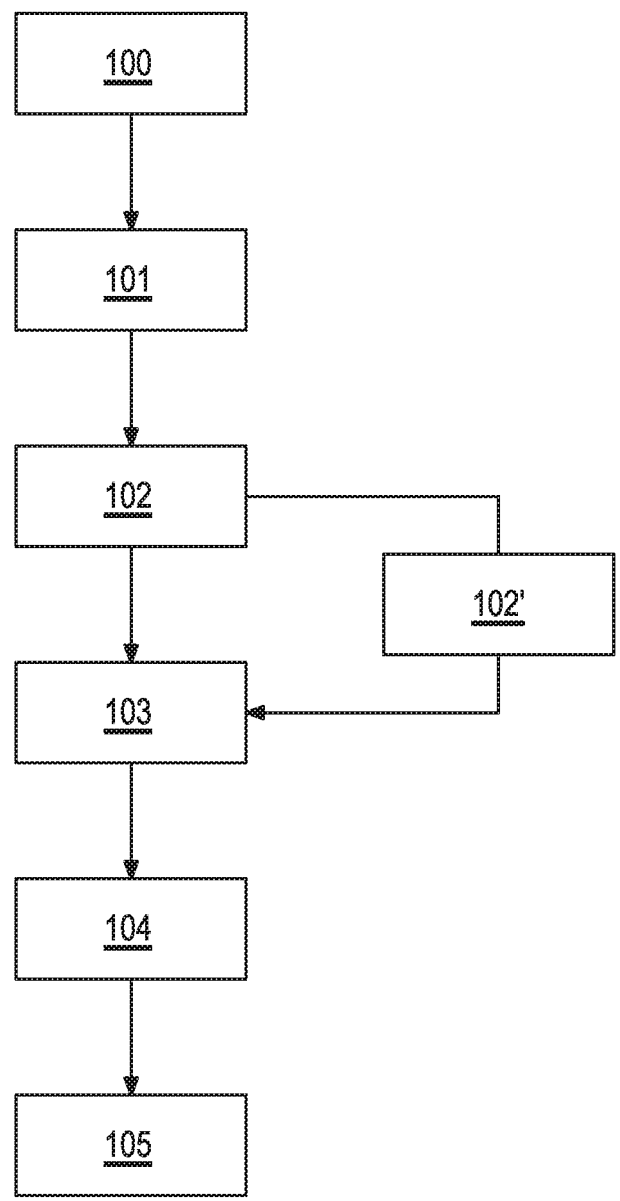
FIG. 2 is a flowchart of an embodiment of a method according to the invention.

FIG. 1 shows a machine tool 2 provided overall with the reference numeral 2, which can be operated by a method according to FIG. 2. The machine tool 2 comprises a tool holder 4 and a tool holder 4 and a drivable, in particular electrical, rotary drive 6.

In addition, the machine tool 2 comprises a, in particular electrical, positioning drive 8, by which a distance between a workpiece 10 and the tool holder 4 is adjustable. In the tool holder 4, a tool 12 can be arranged, which is arranged rotationally fixed in the tool holder 4. In addition, the machine tool 2 shown in FIG. 1 comprises a control unit 16 comprising a storage means 14.

With reference to FIG. 2, with the aid of and reference to the individual components of the machine tool 2 shown schematically in FIG. 1, the method in accordance with the invention is described:

In a first method step 100, tool and/or workpiece data, such as dimensions and material, are detected or provided in the storage means 14 and/or the control unit 16. In a subsequent step 101, at least one reference drive frequency of the rotary drive 6 and/or of the positioning drive 8 is assigned and provided at least as a function of the tool and/or workpiece data, such as dimensions and material.

In a subsequent step 102, at least one ACTUAL drive frequency of the rotary drive 6 and/or of the positioning drive 8 is detected.

The ACTUAL drive frequency and the reference drive frequency may include, for example, the electrical current, the electrical power, the rotational or movement speed of the rotary drive 6 and/or the positioning drive 8.

In a subsequent step 103, the detected ACTUAL drive frequency of a reference drive frequency of the rotary drive 6 and/or the positioning drive 8 is assigned by the control unit 16 and evaluated and interpreted. In this case, the evaluation and interpretation my include, for example, the detection of a reference tool state, the information about the remaining life of the tool 12, the wear of the tool 12 or a dislodging of the tool 12, a breakage of the tool 12 and/or an overload of the tool 12.

In a subsequent step 104, optionally, an indication signal can be generated by which the reference tool state can be displayed and/or a message signal may be generated if the reference drive frequency assigned to the ACTUAL drive frequency reaches or exceeds a reporting criterion.

In this case, the reporting criterion may be selected such that the reference tool state includes a tool dislodging, a tool breakage and/or a tool overload.

In addition, the method may include a further step 105, in which the generated display signals and/or message signals are displayed on a display means. Here, the display means may be assigned directly to the machine tool 2 or comprise an external display means which is independently spatially separated from the machine tool.

In order to further increase the quality of the method, an intermediate step 102' can be provided in which the detected ACTUAL drive frequencies of the rotary drive 6 and/or of the positioning drive 8 are filtered. These can also be stored in the storage means 14 in step 102'.

Method step 101 can be implemented, for example, by storing reference drive frequencies in the storage means 14 and/or in the control unit 16 in data-record-type form. Furthermore, as an alternative or in addition thereto, an algorithm for calculating the reference drive frequency of the rotary drive 6 and/or of the positioning drive 8 can be stored and used to calculate the reference drive frequency.

The features of the invention disclosed in the foregoing description, in the claims and in the diagrams, may be essential both individually and in any combination in the implementation of the invention in its various embodiments.

REFERENCE LIST

2 Machine tool
4 Tool holder
6 Rotary drive
8 Positioning drive
10 Workpiece
12 Tool
14 Storage means
16 Control unit
100—
105 Process steps

The invention claimed is:

1. A method for detecting at least one tool state of a tool of a machine tool for machining workpieces, which includes at least one tool holder, at least one tool holder drivable with an electric or rotary drive, at least one electrical, positioning drive, by which a distance, an angle, or the distance and the angle is adjustable at least between a workpiece and the at least one tool holder, which includes at least one tool which is arrangeable or arranged rotationally fixed in the tool holder and which includes at least one control unit comprising a storage means, comprising the steps of:

detecting or providing at least one of tool data or workpiece data in the storage means or the control unit;

providing at least one reference drive frequency of at least one of the rotary drive or the positioning drive, which can be assigned a reference tool state of the tool at least as a function of the tool data or the workpiece data;

detecting at least one actual driving frequency of at least one of the rotary drive or the positioning drive;

assigning the actual drive frequency of the at least one of the rotary drive or the positioning drive to a reference drive frequency of the at least one rotary drive or the positioning drive by the control unit and assigning the reference tool state of the tool by evaluating or interpreting at least the reference drive frequency assigned to the actual drive frequency by the control unit;

generating a display signal by which the reference tool state is displayable or generating a message signal when the reference drive frequency associated with the actual drive frequency reaches or exceeds a reporting criterion.

2. The method according to claim 1, wherein the display signal or the message signal is displayed on a display means of the machine tool, which is arranged directly on the machine tool or which is functionally assigned to the machine tool or forwarding and displaying the display signal or the message signal on an external display means which is independent of the machine tool.

3. The method according to claim 1, wherein the reference tool state that can be displayed by the display signal comprises at least information about the remaining service life of the tool or wear of the tool or that the reference tool state that can be indicated by the message signal to indicate at least one of a dislodging of the tool, a breakage of the tool or an overload of the tool.

4. The method according to claim 2, wherein the reference tool state that can be displayed by the display signal comprises at least information about the remaining service life of the tool or wear of the tool or that the reference tool state that can be indicated by the message signal to indicate at least one of a dislodging of the tool, a breakage of the tool or an overload of the tool.

5. The method according to claim 1, wherein at least one of the actual drive frequency or the reference drive frequency includes at least one of the electrical current, the electrical power, the rotational or movement speed of the rotary drive, the rotational or movement speed of the positioning drive, the acceleration of the rotary drive, the acceleration of the positioning drive, the position of the rotary drive or the position of the positioning drive.

6. The method according to claim 2, wherein at least one of the actual drive frequency or the reference drive frequency includes at least one of the electrical current, the electrical power, the rotational or movement speed of the rotary drive, the rotational or movement speed of the positioning drive, the acceleration of the rotary drive, the acceleration of the positioning drive, the position of the rotary drive or the position of the positioning drive.

7. The method according to claim 3, wherein at least one of the actual drive frequency or the reference drive frequency includes at least one of the electrical current, the electrical power, the rotational or movement speed of the rotary drive, the rotational or movement speed of the positioning drive, the acceleration of the rotary drive, the acceleration of the positioning drive, the position of the rotary drive or the position of the positioning drive.

8. The method according to claim 4, wherein at least one of the actual drive frequency or the reference drive frequency includes at least one of the electrical current, the electrical power, the rotational or movement speed of the rotary drive, the rotational or movement speed of the positioning drive, the acceleration of the rotary drive, the acceleration of the positioning drive, the position of the rotary drive or the position of the positioning drive.

9. The method according to claim 1, further comprises filtering at least one of the detected actual drive frequency of at least one of the rotary drive or the positioning drive or storing the detected actual drive frequency of the at least one of the rotary drive or the positioning drive in the storage means.

10. The method according to claim 1, wherein the storage means of the control unit comprises a distributed computer structure.

11. The method according to claim 1, wherein the provision of the reference drive frequency of the rotary drive or the positioning drive comprises a data-record-type storage of the reference drive frequency in at least one of the storage means or the control unit,
or depositing of at least one algorithm for calculating the reference drive frequency of the rotary drive or of the positioning drive and calculating the reference drive frequency.

12. The method according to claim 1, wherein the machining of the workpiece comprises an approach and retraction phase and a working phase of the tool and the approach and retraction and working phase are assigned or can be assigned in each case a reference drive frequency.

13. The method according to claim 1, wherein measuring or analysing the tool with a test means for determining the actual tool state of the tool and validating or adjusting the reference tool state by assigning the actual drive frequency at the detected actual tool state as a new reference drive frequency of the rotary drive or the positioning drive.

14. The method according to claim 1, wherein the at least one tool data or the workpiece data are dimensions or materials.

15. A machine tool, which is operable according to a method according to claim 1, comprising at least one tool holder, at least one tool holder drivable with an electric, rotary drive, with at least one electrical, positioning drive by which at least a distance or an angle is adjustable at least between the workpiece and tool holder, with at least one tool which is arrangeable or arranged rotationally fixed in the tool holder and which includes at least one control unit comprising a storage means.

* * * * *